United States Patent [19]
Dion et al.

[11] Patent Number: 5,570,263
[45] Date of Patent: Oct. 29, 1996

[54] COMMUNICATIONS BUS SURGE PROTECTOR

[75] Inventors: Philip G. Dion, Columbia Heights; Brian K. Sorenson, Minnetonka, both of Minn.

[73] Assignee: Dataserv Computer Maintenance, Inc., Chanhassen, Minn.

[21] Appl. No.: 364,207

[22] Filed: Dec. 27, 1994

[51] Int. Cl.⁶ .................................................... H02H 3/22
[52] U.S. Cl. ........................................ 361/119; 361/127
[58] Field of Search .................................. 361/119, 127, 361/111

[56]    References Cited

U.S. PATENT DOCUMENTS

| | | | |
|---|---|---|---|
| 3,790,856 | 2/1974 | Hutchinson | 317/16 |
| 4,114,054 | 9/1978 | Seo et al. | 307/311 |
| 4,254,442 | 3/1981 | Dijkmans et al. | 361/56 |
| 4,408,248 | 10/1983 | Bulley et al. | 361/91 |
| 4,602,484 | 7/1986 | Bendikson | 361/22 |
| 4,849,845 | 7/1989 | Schmitt | 361/56 |
| 5,003,579 | 3/1991 | Jones | 379/93 |
| 5,068,545 | 11/1991 | Molnar | 307/311 |
| 5,089,926 | 2/1992 | Kugelman | 361/87 |
| 5,115,226 | 5/1992 | Schweitzer, III | 340/664 |
| 5,229,909 | 7/1993 | Tessmer et al. | 361/104 |
| 5,237,483 | 8/1993 | Gara | 361/119 |
| 5,274,524 | 12/1993 | Pezzani et al. | 361/56 |
| 5,323,289 | 6/1994 | Longsdorf et al. | 361/111 |
| 5,341,270 | 8/1994 | Kaczmarek | 361/119 |

OTHER PUBLICATIONS

B & B Electronics Manufacturing Company, "Technical Information", 1 page no date.
Horowitz et al., "Voltage Regulators and Power Circuits", pp. 326, 595–598, 860 (1989).

*Primary Examiner*—Todd DeBoer
*Attorney, Agent, or Firm*—Faegre & Benson

[57]    ABSTRACT

A surge protector for coupling exposed (to power surges) data communication end ports having a plurality of bi-directional data lines, and protected data communication end ports having a plurality of associated bi-directional data lines. The surge protector includes a plurality of exposed end terminals, each exposed end terminal for connection to a data line of the exposed port, and a plurality of protected end terminals, each protected end terminal for connection to an associated data line of the protected port. The surge protector includes a plurality of transient surge protection elements. Each transient surge protection element is connected across one exposed terminal and a ground, and short circuits current to ground when voltage on the exposed terminal reaches a threshold limit. The surge suppressor also includes a plurality of opto-isolation elements, each connected between a connection for a transient surge suppressor element and a protected terminal. The opto-isolation elements optically couple and galvanically isolate from each other the protected terminals and the exposed terminals.

6 Claims, 2 Drawing Sheets

COMMUNICATIONS BUS SURGE PROTECTOR

BACKGROUND OF THE INVENTION

The present invention relates generally to voltage surge suppressors for protecting data communication lines from external power surges.

Surge suppressors are electronic devices designed to suppress potentially damaging power surges, or "spikes", across power or communication lines of electronic equipment. Two important characteristics of surge suppressor devices are their isolation voltage value (the maximum spike voltage value the device can handle) and the reaction time (the time period before the device suppresses a spike). In even a moderate power surge, a brief spike of several hundred volts may be present. Lightning surges, accidental high voltage shorts, or ground faults can create spikes as large as 1 kV to 5 kV or more are on communications lines at most locations. Due to their high degree of sensitivity and links to exposed "outside world" connections, communication equipment and communications ports (e.g., RS-232, RS-422) are especially vulnerable and require extremely fast reaction times. Depending on the sensitivity of the protected equipment, reaction times equal to or approaching zero can be necessary.

Transient surge protectors (also known as transient suppressors), are electronic elements similar to Zener diodes and are used as the main component in a number of state of the art surge suppressors. Like a bi-directional high-power zener diode, transient surge protector devices are designed to allow current to flow only when the terminal voltage across the device exceeds a certain level. A number of companies, such as Siemens and General Electric, manufacture transient surge protectors of different values. Transient surge protectors are small, inexpensive, rugged, will handle repetitive high currents (up to 6000 amps), and react fairly quickly to power spikes. However, these devices do not react quickly enough to reliably protect a communications port.

A less common electronic element used as the main component in surge protectors is an opto-isolator. Opto-isolator devices include an LED emitter and a photo-detector placed in close proximity. Incoming data signals are applied to the LED side of an opto-isolator. The LED generates a modulated light beam from the signal. On the other side, the photo-detector, usually a photo-transistor, receives the light beam and converts it back to an electrical signal. There is no electrical connection between the input and output of the opto-isolator. Opto-isolators provide protection by "galvanically" isolating (creating a signal coupling without any direct connections) ports to minimize the effects of surges and to protect ports having different ground potentials. A number of companies, again such as Siemens and General Electric, offer opto-isolators.

Although opto-isolator devices by their very nature isolate ports from power surges at all times (reaction time= 0), the devices have two limitations. Heavy surges (e.g., currents> 100 mA), such as a lightning strike, can destroy the diodes in the opto-isolator. High voltage surges (e.g., voltages> 2500 V) can arc across the device. Either event can result in communications failure and damage to the equipment. Opto-isolators also require isolated power supplies.

Neither transient suppressor-based surge protectors nor opto-isolator-based surge protectors offer both the fast reaction times and large voltage handling capability necessary to reliably protect communication ports. Prior art surge protectors are either too slow to react to a voltage spike before damage occurs or not able to appropriately suppress a spike of a large magnitude. Whatever the cause, the spike still damages the 'protected' port.

SUMMARY OF THE INVENTION

The present invention is an improved surge suppressor for data communication lines that provides both high voltage isolation and constant electrical isolation. The surge suppressor includes both transient suppressors and opto-isolators, arranged so as to eliminate the drawbacks of both while preserving their advantages.

The surge protector is designed and configured to couple a data communications port of an "exposed" (i.e., vulnerable to electrical surges induced by lightning or other conditions) data communication bus with a data communications port of a "protected" device (or of a protected bus). The communication bus includes a plurality of data communication lines for connection to associated data communication lines in the device. The surge protector includes a plurality of data line coupling and suppressing subcircuits, generally one subcircuit for each data communication line.

Each coupling and suppressing subcircuit includes a first communications terminal, for connection to a data line of the port of the exposed data bus, and a second communications terminal, for connection to the associated data line of the port of the protected device. A transient surge protection element is connected between the first communications terminal and a ground terminal, for conducting current to ground when voltage in the first terminal reaches a threshold limit. An opto-isolation element is connected between the connection for the transient surge protection element and the second communications terminal, for optically coupling and galvanically isolating the first terminal and the second terminal. In case of a surge traveling from the exposed data bus, the transient suppressor element, which is in the "front end", removes most of the energy from a surge, while the "back end" optical-isolators block the small spike that remains.

DETAILED DESCRIPTION OF THE INVENTION

Figure 1:
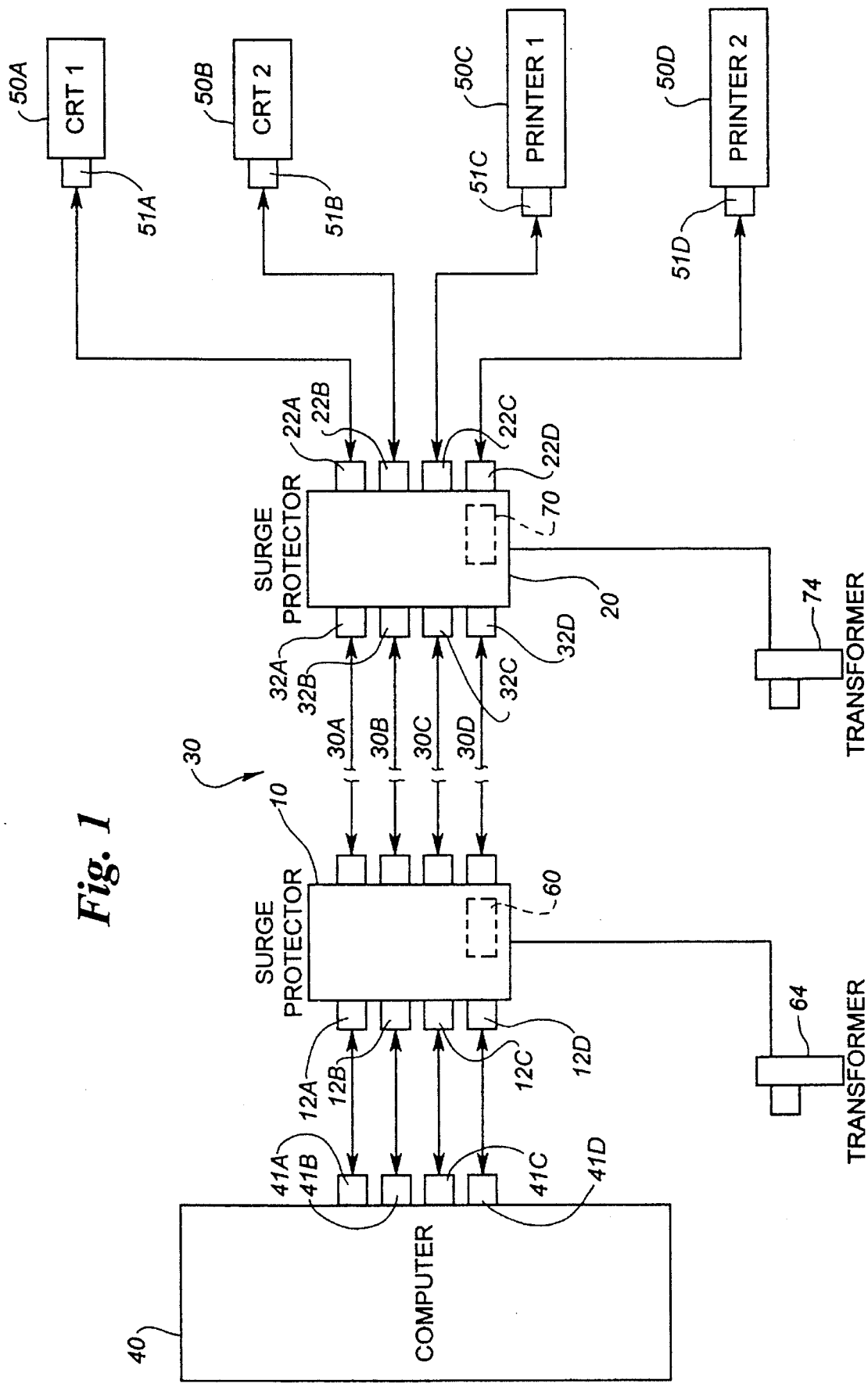
FIG. 1 is a block diagram of two surge protector devices in accordance with the present invention connected to either end of a communications bus between a computer and peripheral electronic devices. The surge protectors are powered by power supplies.

FIG. 1 is a block diagram showing two surge protector devices 10 and 20 in accordance with the present invention connected to either end of an exposed data communications bus 30. Surge protector device 10 is also connected to a central computer (i.e., a first electronic device) 40 and the second surge protector device 20 is connected to peripheral devices (i.e., second electronic devices), such as CRTs 50A and 50B and printers 50C and 50D. Together, communications bus 30 and the surge protector devices 10 and 20, couple the computer 40 with second electronic devices 50A–D for data communications.

Communications data bus 30 includes four RS-232 protocol four-bit bi-directional data sub-buses 30A–30D. Data communications bus 30 can include any type of communication lines and data transmission equipment (for example cables, dedicated lines, token-rings, Ethernet networks, network lines, modems, network controllers, bridges, gateways, routers, etc.). Bus 30 includes a set of first end bus ports 31A–31D, located at one end of sub-buses 30A–30D respectively, and a set of second end bus ports 32A–32D, located at the other end of sub-buses 30A–30D respectively.

Surge protector device 10 has a set of exposed end first ports 11A–11D (RS-232 equipment ports) connected respectively to the set of first end bus ports 31A–31D of the data communications bus 30. Surge protector device 10 has a set of protected end second ports 12A–12D, forming associated port pairs with the respective exposed first ports 11A–11D. Second ports 12A–12D are respectively connected to first device ports 41A–41D of the computer 40. Surge protector 20, likewise, has a set of exposed first ports 21A–21D connected to end bus ports 32A–32D at the other end of the data bus 30, and a set of protected second associated data ports 22A–22D connected to device ports 51A–51D of electronic devices 50A–50D respectively.

Surge protectors 10 and 20 are powered by power supplies 60 and 70 respectively (shown in phantom outline in FIG. 1), which are connected to VAC wall transformers 64 and 74. Power supplies 60 and 70 are conventional isolated power supplies. Since the embodiment shown uses RS-232 ports (which have a±12 V logic), power supplies 60 and 70 include a positive (+12 V) and a negative (−12 V) terminal (see FIG. 2).

The surge protector 10 couples the end bus ports 31A–D and the computer device ports 41A–D. The surge protector 20 couples the end bus ports 32A–D and the device ports 51A–D.

In the embodiment shown, each sub-bus 30A–30D of data bus 30 is designed to meet the needs of four-bit RS-232 bi-directional communications equipment. Therefore, each sub-bus 30A–30D includes nine lines—four data transmission lines in each direction and one ground line (not individually shown in FIG. 1). Each data line has a matching terminal at each end bus port 31A–D and 32A–D.

Figure 2:
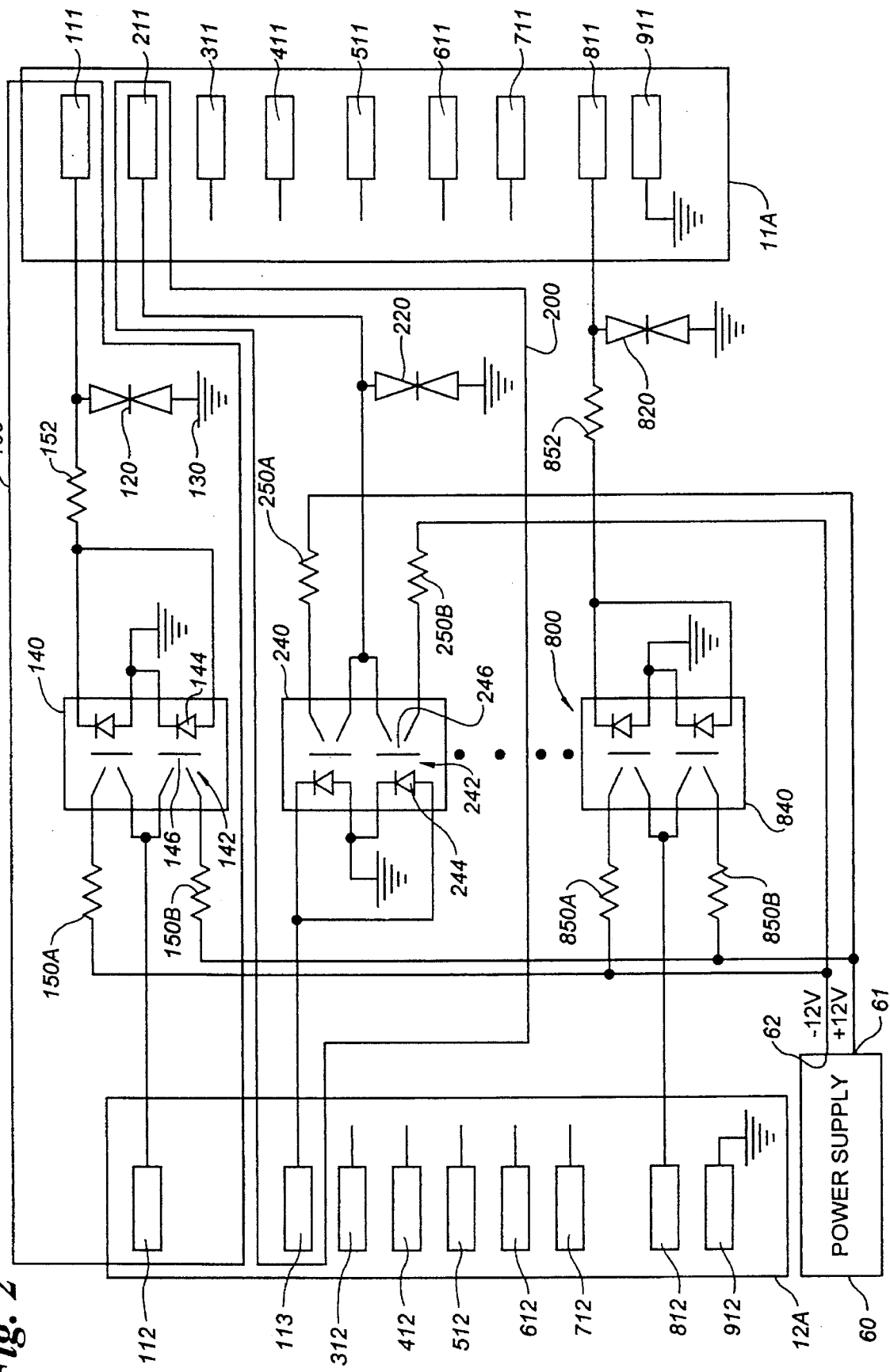
FIG. 2 is an electrical schematic diagram of a portion of the electrical circuit of the surge protector of FIG. 1.

FIG. 2 is a schematic diagram of a portion of the electrical circuit of the surge protector 10, specifically of the circuit connecting first and second ports 11A and 12A. Similar circuits connect each matching pair of ports 11B to 12B, 11C to 12C, and 11D to 12D. Power supply 60 including positive terminal 61 and negative terminal 62 is also depicted.

First port 11A has nine exposed end bus end terminals 111, 211, 311, 411, 511, 611, 711, 811, and 911 to match the nine terminals of end bus port 31A. Likewise, second port 12A has nine protected end associated device terminals 112, 212, 312, 412, 512, 612, 712, 812, and 912 to match the terminals of device port 41A. In other embodiments, each port of the surge protector may have a different number of terminals to match the number of terminals of a different sub-bus and of a different electronic device.

Surge suppressor subcircuits, such as subcircuit 100 and subcircuit 200, couple associated terminals and suppress surges across them. The subcircuit 100 includes the first communications terminal 111 (for connection to a first data line of end port 31A) and the associated second communications terminal 112 (for connection to a first data line of device port 41A). Subcircuit 100 further includes a transient surge protection element 120 connected between the first communications terminal 111 and a ground 130. In one embodiment for RS-232 equipment, transient surge protector element 120 is a commercially available 1.5KE15CA device.

The subcircuit 100 further includes an opto-isolation element 140 interconnected between the first terminal 111 and the second communications terminal 112. More specifically, the opto-isolation element 120 is connected between the connection for the transient surge suppressor element 120 and the second communications terminal 112, so the transient surge suppressor element 120 is connected closer to the exposed end first terminal 111. The opto-isolation element 140 is designed for optically coupling and galvanically isolating the second terminal 112 from the first terminal 111.

In the embodiment shown, the opto-isolation element 140 is a bi-directional drive and includes two identical LED photo-transistor pairs 142, connected in reverse polarities to allow for dual polarity data communications signals. In one embodiment the opto-isolation element 30 is a commercially available PS2501 device. Other embodiments (not shown) can include only one LED photo-transistor or photo-diode pair for single polarity communications signals.

Each LED photo-transistor pair 142 includes a light emitting diode (LED) 144 and a photo-transistor 146. Photo-transistor 146 has a light sensitive base, a collector, and an emitter. The collectors of photo-transistors 146 are connected to the power supply 60. In the present embodiment, the power supply 60 provides a voltage of ±12 V, which matches the logic levels of RS-232 equipment. In other embodiments, the power supply can provide different voltage levels to match the logic levels of other types of equipment such as RS-422 (typically ±5 V).

The emitters are connected to the second terminal 112. The LED 144 is connected to the first terminal 111. In the present embodiment, biasing resistors 150A and 150B are each connected in series between the emitters of the photo-transistors 146 of the opto-isolation element 140 and the positive and negative poles of the power supply 60, and a current limiting resistor 152 is connected in series between the opto-isolation element 140 and the first terminal 111.

Since the opto-isolation component 140 maintains the terminals 111 and 112 optically isolated from each other, the subcircuit 100 offers constant isolation and reaction times equal to or approaching zero. Since the transient surge suppressor element 120 can absorb large current surges, subcircuit 100 also offers high voltage isolation. The transient suppressor element 120 is placed closest to the exposed end (closest to the communications cable) and short circuits to conduct the potentially harmful current surge to the ground 130 when signals above a certain threshold level (in the present circuit ±15 V) are present on terminal 111. While the transient suppressor element 111 clamps most of the voltage and current from a power surge, the opto-isolation element 140 galvanically isolates (prevents direct electrical current flow) the protected end second terminal 112 and blocks any remainder of the current surge or voltage differential. Furthermore, the opto-isolation element 112 also "absorbs" the initial current that flows before the transient suppressor element 120 has had an opportunity to be triggered.

Since the surge protector 10 is connected to the bi-directional communication bus 30, bi-directional communication lines are available. Subcircuit 200 duplicates all the elements of subcircuit 100 (matching elements of subcircuit 200—as well as those of other similar subcircuits, e.g. 800—are designated by the same two last digits as those of the corresponding elements of subcircuit 100). The exception is that opto-isolation element 240 is directionally reversed, that is, LED 244 is connected to a second terminal 212 and photo-transistor 246 is connected to a first terminal 211. In other embodiments (not shown), one matching terminal pair (rather than two) can be used for bi-directional communication by connecting two oppositely oriented opto-isolation elements across the matching terminals.

Except for the ground terminals 911 and 912, the remaining matching terminal pairs of ports 11A and 12A of surge suppressor 10 are coupled by subcircuits similar to the subcircuit 100 or the subcircuit 200.

Other surge suppressor embodiments (not shown) can include variations of the original subcircuit design coupling terminal pairs matching the particular end or device ports. For example, data communication buses that use relatively positive and negative complementary input and/or output terminals for the same signal can be accommodated by adding an additional opto-isolation element and directing the connections to the opto-isolators in accordance with the relative polarity of the input and output terminals. Additional transient suppressor elements also can be connected across complimentary terminals to prevent damaging voltage differentials.

The present invention offers significant advantages over the prior art. By using both transient suppressor and opto-isolator devices, the present invention offers the advantages of both devices while eliminating their disadvantages. The present invention isolates the electronic device from the exposed communications bus. A surge protector in accordance with the present invention does not require the ground to be broken and only requires one wall transformer at each location (to provide power for the unit, not isolation).

Although the present invention has been described with reference to preferred embodiments, those skilled in the art will recognize that changes can be made in form and detail without departing from the spirit or scope of the invention.

What is claimed is:

1. A surge protector for coupling an exposed bi-directional and ground-referenced signal data communication bus and a protected bi-directional and ground-referenced data signal communication bus, comprising:

an exposed port adapted to be interconnected to the exposed communication bus, including:
   a ground terminal, for connection to a ground terminal of the exposed communication bus,
   a first direction signal terminal, for connection to a first direction signal terminal of the exposed communication bus; and
   a second direction signal terminal, for connection to a second direction signal terminal of the exposed communication bus;

protected port adapted to be interconnected to the protected communication bus, including:
   a ground terminal, for connection to a ground terminal of the protected communication bus:
   a first direction signal terminal, for connection to a first direction signal terminal of the protected communication bus; and
   a second direction signal terminal, for connection to a second direction signal terminal of the protected communication bus;

a first direction transient surge protection element connected to the exposed port first direction signal terminal and to a ground, for conducting current to ground when voltage in the exposed port first direction signal terminal reaches a threshold limit;

a second direction transient surge protection element connected to the exposed port second direction signal terminal and to a ground, for conducting current to ground when voltage in the exposed port second direction signal terminal reaches a threshold limit;

a first direction opto-isolation element connected between the first direction transient surge protection element and the protected port first direction signal terminal, for optically coupling and galvanically isolating the exposed port first direction signal terminal and the protected first direction signal port terminal; and a second direction opto-isolation element connected between the second direction transient surge protection element and the protected port first direction signal terminal, for optically coupling and galvanically isolating the exposed port second direction signal terminal and the protected port second direction signal terminal.

2. The surge protector of claim 1, wherein each opto-isolation element includes at least one matching LED-photo-diode pair.

3. The surge protector of claim 1, further comprising a power supply connected to each opto-isolation element.

4. A surge protector for coupling an exposed parallel data communications bus to a protected parallel data communications bus, the exposed bus having a ground terminal and a plurality of first direction and second direction signal terminals for coupling ground-referenced data signals, and the protected bus having a ground terminal and a plurality of first direction and second direction signal terminals for coupling ground-referenced data signals, the surge protector comprising:

an exposed port adapted to be interconnected to the exposed communications bus, including:
   a ground terminal, for connection to the ground terminal of the exposed communications bus;
   a plurality of first direction signal terminals, each connected to one of the first direction signal terminals of the exposed communications bus to receive the ground-referenced data signals; and
   a plurality of second direction signal terminals, each connected to one of the second direction signal terminals of the exposed communications bus to couple the ground-referenced data signals;

a protected port adopted to be interconnected to the protected communications bus, including:
   a ground terminal for connection to the ground terminal of the protected communications bus;
   a plurality of first direction signal terminals, each connected to one of the first direction signal terminals of the protected communications bus to couple the ground-referenced data signals; and
   a plurality of second direction signal terminals, each connected to one of the second direction signal terminals of the protected communications bus to receive the ground-referenced data signals;

a first direction transient surge protection element connected between each exposed port first direction signal terminal and a ground, for conducting current to ground when voltage on the exposed port first direction signal terminals reaches a threshold limit;

a second direction transient surge protection element connected between each exposed port second direction signal terminal and a ground, for conducting current to ground when voltage on the exposed port second direction signal terminals reaches a threshold limit;

a first direction opto-isolation element connected between each first direction transient surge protection element and an associated protected port first direction signal terminal, for optically coupling and galvanically insulating the exposed port first direction signal terminals and the protected port first direction signal terminals; and a second direction opto-isolation element connected between each second direction transient surge protection element and a protected port second direction signal terminal, for optically coupling and galvanically insulating the exposed port second direction signal terminals from the protected port second direction signal terminals.

5. The surge protector of claim 4, further comprising a power supply connected to each opto-isolation element, for providing electrical power to the opto-isolation element.

6. An optically isolated and surge protected communications network, comprising:

a central electronic device having a central device port having a ground line and a plurality of first direction and second direction data lines;

a peripheral electronic device having a peripheral device port having a ground line and a plurality of first direction and second direction data lines;

a communications data bus having a central bus end port and a peripheral bus end port, each bus end port having a ground line and plurality of first direction and second direction data lines; and a first surge protector coupling the central device port and the central bus end port, and a second surge protector coupling the peripheral device port and the peripheral bus end port, the first and second surge protectors comprising:

an exposed port having ground terminal and a plurality of first direction and second direction terminals, for connection to the ground line and first direction and second direction data lines, respectively, of a bus end port, for communication of ground-referenced signals, a protected port having a ground terminal and a plurality of first direction and second direction signals, for connection to the ground line and first direction and second direction data lines, respectively, of a device port, for communication of ground-referenced signals, a transient surge protection element connected across each first direction and second direction terminal of the exposed port and a ground, for conducting current to ground when voltage on the exposed ports reaches a threshold limit, and an opto-isolation element connected between each transient surge protection element and an associated first direction and second direction terminal of the protected port, for optically coupling and galvanically insulating the exposed port and the protected port.

* * * * *

UNITED STATES PATENT AND TRADEMARK OFFICE
CERTIFICATE OF CORRECTION

PATENT NO. : 5,570,263
DATED : October 29, 1996
INVENTOR(S) : Philip G. Dion, et al.

It is certified that error appears in the above-indentified patent and that said Letters Patent is hereby corrected as shown below:

Column 5, line 53, before "protected" insert --a--

Column 5, line 56, delete ":" and insert therefor --;--

Column 8, line 6, before "ground" insert --a--

Signed and Sealed this

Eleventh Day of March, 1997

Attest:

BRUCE LEHMAN

*Attesting Officer*         *Commissioner of Patents and Trademarks*